Sept. 2, 1969      K. HARTMANN      3,464,538
CONVEYOR BELT
Filed Aug. 8, 1967
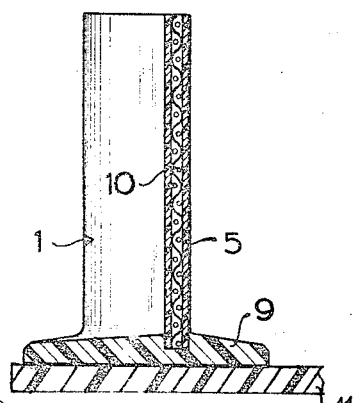
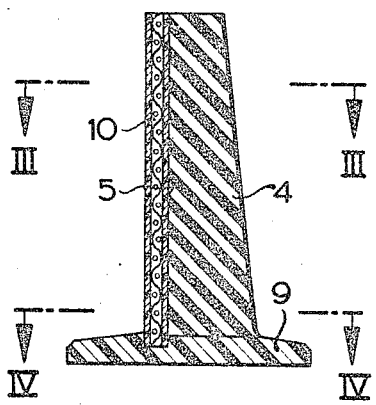
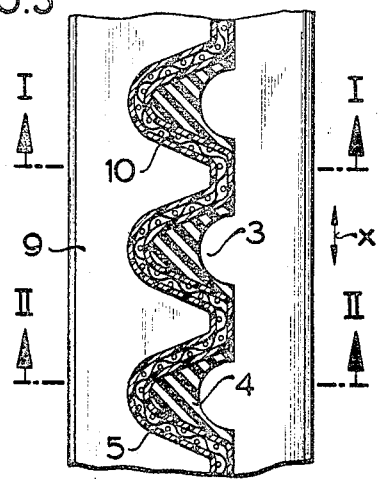
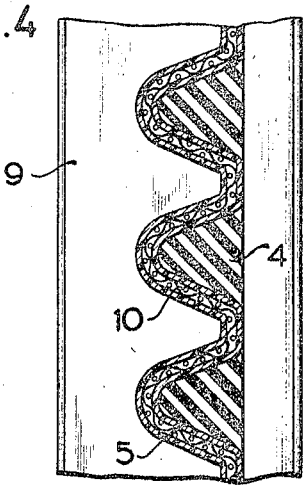
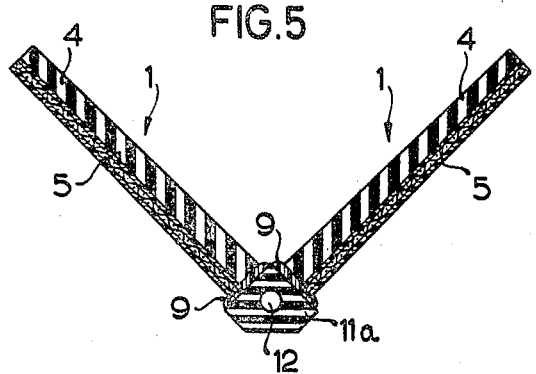
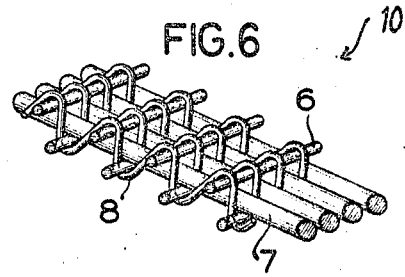
INVENTOR
Karl Hartmann
by Michael S. Striker
Attorney

United States Patent Office 3,464,538
Patented Sept. 2, 1969

3,464,538
CONVEYOR BELT
Karl Hartmann, 3 Luisenstrasse,
4102 Homberg, Germany
Filed Aug. 8, 1967, Ser. No. 659,239
Claims priority, application Germany, Aug. 10, 1966,
H 60,207
Int. Cl. B65g 15/40
U.S. Cl. 198—201                                    11 Claims

ABSTRACT OF THE DISCLOSURE

A conveyor belt comprises an elongated bottom wall portion which has a surface, and at least one elongated side wall portion which extends along the bottom wall portion and projects from the surface inclined thereto. The side wall portion has a first face and an oppositely directed second face and is corrugated transversely of its elongation so as to define in both of these faces a plurality of longitudinally extending alternating waves and troughs. An elastically yieldable substance is provided and at least partly filled troughs of at least one of the faces of the side wall portion.

BACKGROUND OF THE INVENTION

The present invention relates to conveyor belts in general, and more particularly to conveyor belts which comprise bottom wall portions and side wall portions extending up at an angle to a surface of the bottom wall portion.

It is known to provide conveyor belts with a bottom wall portion having a surface, and with one or two side wall portions which extend along the bottom wall portion and rise from the surface. The wall portions thus define with one another a trough-shaped configuration into which the material to be conveyed is placed. In some instances the side wall portions are corrugated transversely of their longitudinal extension, and thus also transversely of the longitudinal extension of the bottom wall portion and they may be reinforced with suitable reinforcing means. The bottom wall portion and the side wall portion or portions are joined by means of an adhesive, by vulcanizing or in another suitable manner.

Conveyor belts of this type known from the art have a variety of disadvantages. Thus, the side wall portions are not very resistant to deformation under the pressure of material contained in the trough which they define with the bottom wall portion, and accordingly they must be made relatively low. This, however, means that the trough of the thus-constructed conveyor belt must be rather shallow, thereby limiting the conveying capacity of the belt. Furthermore, in the return stringer of the belt, that is in that region where the endless belt reverses direction at the end of the conveying run and returns to the starting point of the run, is difficult because the corrugated side wall portions cannot be properly engaged by the guide rollers which are provided. This is particularly bothersome in the so-called S-conveyors which serve to convey material between different elevations. The corrugations in the side wall portions cause the belt to produce undesirable noises, particularly in the return-stringer region, and their engagement with the return guide rollers has a braking or delaying effect in the region of the return-stringer movement.

Another disadvantage of belts of this type which are known from the prior art is the fact that they are limited in use for the conveyance of only certain specific materials, namely light dry materials, because moist material, or material which is tacky or has analogous properties will adhere in those recesses or depressions of the corrugations which face the interior of the belt trough. The material which is thus deposited in these recesses cannot be removed by providing stripper members at or adjacent the end of the conveying run and letting these slide over the side wall portions for stripping purposes. This is not possible because of the corrugation and prior-art belts of this type, when they are required to convey such moist or tacky materials, are therefore quickly fouled by considerable quantities of the material which adhere in the recesses of the corrugated side wall portions and must be removed by hand and conveyed to the collecting station at the end of the conveying run either manually or in any case in a manner other than via the conveying belt.

SUMMARY OF THE INVENTION

The present invention overcomes the disadvantages outlined above.

More particularly, the present invention provides a conveyor belt wherein the side wall portions are more resistant to deformation by the material being conveyed, and can therefore have a greater height than this is known from the prior art.

Accordingly, my novel conveyor belt has a considerably improved conveying capacity.

Furthermore, my conveyor belt is capable of transporting moist materials, or materials which are tacky or have analogous properties, and can be readily cleaned if such materials should adhere in recesses of the corrugated side wall portions.

My conveyor belt according to the present invention also is capable of supporting cover belts or members such as are used on S-conveyors for covering the trough containing the material being conveyed, particularly during conveyance of the material between levels of elevation.

In accordance with one feature of my invention I provide a conveyor belt which comprises an elongated bottom wall portion having a surface, and at least one elongated side wall portion which extends along the bottom wall portion and projects from the surface inclined thereto. Evidently, it will ordinarily be necessary to provide two of these side wall portions; however, it is conceivable that only one side wall portion might be needed because the material could be prevented from falling off the belt at the other side opposite the one side wall portion by some other means.

In any case, my elongated side wall portion extends along the bottom wall portion and projects from the surface inclined to the latter. It has a first face and an oppositely directed second face and is corrugated transversely of its elongation so as to define in both of the faces a plurality of longitudinally alternating waves and troughs. In accordance with my invention I provide an elastically yieldable substance which at least partly fills the troughs of at least one of the faces of my side wall portion.

This elastically yieldable substance provides the necessary stiffening for the side wall portion to prevent it from being deformed and outwardly collapsed under the pressure of material being carried on the conveyor belt. If the substance is arranged at least partly filling the troughs on that face which faces inwardly, that is which faces the material being conveyed, then some of this material can still adhere in the remaining recesses, to the extent that these recesses are not completely filled by the elastically yieldable substance. However, as the belt passes at the end of the conveying run around the reversing rollers the side wall portions and thereby the elastically yieldable substance, which adheres to the respective face of the side wall portion, are subjected to stretching so that the recesses, or what remains of them in view of the partial filling with the elastically yieldable substance become very shallow indeed and material which adheres can be stripped by stripper elements provided for this purpose.

I further reinforce the side wall portion by embedding the material thereof a reinforcing fabric consisting of warp threads which extend substantially in longitudinal direction of the side wall portion, and of weft threads which extend transversely of the warp threads. In accordance with my invention the weft threads of the reinforcing fabric, which latter is arranged substantially midway between the opposed faces of the side wall portion, are stiffer and harder than the warp threads, or their stiffness and hardness is at least equal to that of the warp threads. It will be understood that conventionally it is the warp threads whose stiffness and hardness exceeds that of the weft threads.

By reinforcing my side wall portion in this manner, and further via the elastically yieldable material mentioned before, I can increase the height of my side wall portion from the conventional height of approximately 80 mm. to approximately 250 mm. and it is evident that this will result in a substantial increase in the conveying capacity of a belt thus constructed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a section taken on the line I—I of FIG. 3 and illustrates an embodiment of my invention;

FIG. 2 illustrates the embodiment of FIG. 1 and is a section taken on the line II—II of FIG. 3;

FIG. 3 is a partly sectioned view taken on the line III—III of FIG. 2;

FIG. 4 is a partly sectioned view taken on the line IV—IV in FIG. 2;

FIG. 5 is a vertical section through a V-shaped conveyor belt embodying my invention; and FIG. 6 is a fragmentary view of a portion of a reinforcing fabric according to my invention.

DESCRIPTION OF THE PREFERRED EMBODIMENTS

Discussing now the drawing in detail, and firstly FIGS. 1–4 thereof, it will be seen that I show one side wall portion 1 which may consist of rubber or a synthetic plastic material provided with a textile or metal reinforcing fabric such as I have illustrated in FIG. 6 which will be discussed subsequently.

The side wall portion 1 is provided with a transversely extending base or foot 9 which is suitably secured in a known manner to a bottom wall portion 11 of a conveyor belt. The bottom wall portion 11 can be of different configurations, as will become apparent hereafter, and has been shown in FIG. 1 only by way of example and to provide an orientation as to the positioning of the side wall portion 1 with reference to the remainder of the belt. In FIGS. 2–4 the bottom wall portion 11 has been omitted as not essential for an understanding of the invention.

Also by way of information the direction of movement of the conveyor belt comprising my side wall portion 1 is indicated in FIG. 3 by a double-headed arrow $x$.

From FIGS. 3 and 4 it is clear that the side wall portion 1 is extending in longitudinal direction of the conveyor belt, that is in the direction of movement thereof, and that it is corrugated transversely of this direction so as to provide on its two oppositely directed faces alternating waves and troughs. It is clear from the drawing, for instance from FIG. 1 thereof, that the side wall portion 1 is inclined with reference to the surface of the bottom wall portion 11 on which it is mounted.

FIG. 3 clearly indicates that, in accordance with my invention, the troughs 3 on at least one side of the side wall portion 1, namely the side of the face 5, are at least partially filled with elastically yieldable material 4. This material adheres to the face 5, as is evident. Such material may be rubber, or a synthetic plastic material, or any other elastomeric material which possesses certain characteristics, namely resistance to abrasion and the ability to be adhered firmly to the face 5, for instance by vulcanizing. Of course, if certain requirements are made of a belt so constructed, for instance if the belt is to convey material at elevated temperatures, the elastically yieldable material 4 may be selected with a view to such requirements. Thus, if the material to be conveyed on the belt is placed thereonto at elevated temperatures, then the elastically yieldable material 4 may be selected to resist such elevated temperatures. Asbestos may for instance be utilized. Evidently, combinations of materials to achieve the desired properties are encompassed in this concept of my invention.

With reference to FIG. 1 it has already been pointed out that the side wall portion 1 comprises a base or foot 9 and it will be evident that the connection between the two is elastic so that yielding of the side wall portion 1 with respect to its base 9 is possible. While it has been previously stated that the base 9 can be secured to the bottom wall portion 11 in any suitable well known manner it might here be pointed out that this can be accomplished by means of adhesives, by vulcanizing, by riveting or in another fashion.

FIGS. 1–4 show that a reinforcing fabric 10 is embedded in the material of the side wall portion 1 intermediate the oppositely directed side faces thereof, but not in the elastically yieldable material 4. The reinforcing fabric 10 extends in longitudinal direction of the side wall portion 1 and its lower edge portion extends to the base 9 in which it is anchored, as is clearly evident from FIGS. 1 and 2.

Such a reinforcing fabric is illustrated in FIG. 6 and it has already been pointed out that it may consist of textile materials or of metallic materials. It comprises the warp threads 7 which extend in the longitudinal direction of the side wall portion 1, and the weft threads 6 which extend transversely of this longitudinal direction, as is evident from FIGS. 1–4. In accordance with my invention the weft threads 6 have a hardness and stiffness which is at least equal to the same characteristics of the warp threads 7, and preferably are substantially greater than is the case in the warp threads 7. The weft threads 6 are spaced from one another in longitudinal direction of the warp threads 7 and are disposed alternately at opposite sides of the plane which is common to the warp threads 7, as is evident from FIG. 6. In accordance with my invention I connect these weft threads 6 with looped connecting threads 8. FIG. 6 shows that the loops of each of these connecting threads 8 are disposed between two adjacent ones of the warp threads 7 and are arranged in a plane extending normal to the plane common to the warp threads 7, with the planes of the individual connecting threads 8 being substantially parallel. By giving the weft and warp threads the aforementioned characteristics, and by additionally providing the connecting threads 8, I obtain a reinforcing fabric which has exceedingly high transverse bending resistance; thus reinforced the side wall portion 1 is able to withstand the outwardly directed pressure of the material carried by the conveyor belt. Furthermore, the use of this reinforcing fabric in the side wall portion 1 so reinforces the latter that the forces transmitted by the drive roller or drum for the conveyor belt can be effective to the upper free edges of the side wall portion 1 without any danger that under the influence of these forces the side wall portion 1 would be deflected or bent laterally. Under these circumstances it will be clear that the forces absorbed by the reinforcing fabric 10 are sufficient to stretch the elastically yieldable material 4 in the recesses of the side wall portion at the point of direction reversal of the belt and to the extent necessitated by the diameter of the reversing rollers or drum.

This stretching, on the other hand, makes it easily possible for stripping devices provided in the region of direction reversal of the belt to strip whatever material may have adhered in the remainder of the recesses 3 prior to such stretching. Of course, as FIG. 4 shows it is possible to completely fill the recesses 3 rather than doing so only partially.

It is to be noted that the considerably increased height of the side wall portions 1, and their resistance to bending and deflection as outlined above, makes it possible to utilize a thus-constructed conveyor belt without any difficulty in S-conveyors where materials must be conveyed at a steep incline or even vertically because cover belts can now clearly be used with a conveyor belt according to my novel invention. In fact, the possibility of utilizing cover belts makes it possible to eliminate the suction devices and other special constructions which heretofore were needed where material was to be raised from level to level.

It will be understood that passage of a conveyor belt according to my present invention around the direction-reversing rollers is not at all adversely influenced because the material 4 will readily yield when stretched.

FIG. 5 shows a specific embodiment of a conveyor belt using two of the side wall portions 1. In this embodiment the conveyor belt defines a conveying trough of V-shaped cross section with each of the side wall portions 1 being secured via its base 9 to a bottom wall portion 11a of polygonal cross section. Securing of the bases 9 to the portion 11a can be effected in the manner pointed out before, for instance by vulcanizing, riveting or the like. It is clear that the surface of the portion 11a on which the two side wall portions 1 are secured in this case comprises two mutually inclined facets and that the side wall portions 1 are each inclined to the surface as well as with reference to the other side wall portion. The portion 11a advantageously consist of flexible material having a high tensile strength, for instance a suitable plastic material many of which are known to those skilled in the art. The tensile strength of the portion 11a can be still further enhanced by embedding therein at least one rope or similar member 12 which forms an endless loop extending in the longitudinal direction of the member 11a. The construction of the side wall portions 1 is that which has already been set forth above.

As pointed out earlier the elastically yieldable material 4 is stretched in longitudinal direction of the conveyor belt when any given increment of the side wall portion 1 passes around the direction-reversing roller of the belt. It goes without saying that in an embodiment in which the recesses or troughs 3 of the side wall portion 1 are only partially filled, rather than being completely filled as shown in FIG. 4, they should be filled to such an extent that on stretching of the material 4 resulting from passage of the respective increment of the side wall portion 1a around the direction-reversing roller, any remaining depression should completely or substantially completely disappear so that the side wall portion 1 will have an inwardly directed surface which is either completely or substantially planar and approaches the appearance which is illustrated in FIG. 4. This, as previously pointed out, makes it possible to have this surface cleaned by stripping devices which strip therefrom any material which is being conveyed on the novel belt which has a tendency to adhere to the side wall portion.

It will be understood that each of the elements described above, or two or more together, may also find a useful application in other types of conveyor belts differing from the types described above.

What is claimed as new and desired to be protected by Letters Patent is set forth in the appended.

1. In a conveyor belt comprising an elongated bottom wall portion having a surface, and at least one elongated side wall portion extending along and in contact with said bottom wall portion integral therewith over substantially its entire length and projecting from said surface inclined thereto, said side wall portion having a first face and an oppositely directed second face and being corrugated transversely of its elongation so as to define in both of said faces a plurality of longitudinally alternating waves and troughs, the improvement consisting in the provision of an elastically yieldable substance at least partly filling the troughs of at least one of said faces of said side wall portion and adhering to said one face.

2. In a conveyor belt as defined in claim 1; wherein said one face faces the material conveyed on said conveyor belt.

3. In a conveyor belt as defined in claim 2; and further comprising reinforcing means embedded in said side wall portion.

4. In a conveyor belt as defined in claim 3, wherein said reinforcing means is a reinforcing fabric comprising warp threads extending substantially in longitudinal direction of said side wall portion, and weft threads extending transversely of said warp threads.

5. In a conveyor belt as defined in claim 4, wherein said warp threads are of a given stiffness, and wherein said weft threads have a stiffness at least equal to said given stiffness of said warp threads.

6. In a conveyor belt as defined in claim 5, wherein said substance is a heat-resistant material.

7. In a conveyor belt as defined in claim 5, wherein said substance is an elastomeric material.

8. In a conveyor belt as defined in claim 5, wherein said reinforcing fabric is embedded in said side wall portion substantially midway between said first and second faces.

9. In a conveyor belt as defined in claim 5, wherein successive ones of said weft threads are spaced from one another in longitudinal direction of said warp threads; said reinforcing fabric further comprising connecting threads looped about the successive weft threads and connecting the same.

10. In a conveyor belt as defined in claim 5; and further comprising an additional side wall portion similar and extending along the first-mentioned side wall portion transversely spaced therefrom and also projecting from said surface inclined thereto as well as with reference to said first-mentioned side wall portion, said additional side wall portion also defining longitudinally alternating waves and troughs and said elastically yieldable substance at least partly filling these troughs of said additional side wall portion which face said first-mentioned side wall portion.

11. In a conveyor belt as defined in claim 10, wherein said bottom wall portion is of polygonal cross-sectional configuration, said surface comprising two mutually inclined facets and each of said side wall portions being provided on one of said facets.

References Cited

UNITED STATES PATENTS 3,297,513  1/1967  Robinson _____ 198—193 X

FOREIGN PATENTS 18,561  8/1911  Great Britain.
1,110,561  2/1956  France.

EDWARD A. SROKA, Primary Examiner